(12) United States Patent
Butler et al.

(10) Patent No.: US 7,224,308 B2
(45) Date of Patent: May 29, 2007

(54) IDENTIFICATION AND LOCATION SYSTEM FOR PERSONNEL AND VEHICLES

(76) Inventors: Walker Butler, 11837 N. Paradise Dr., Scottsdale, AZ (US) 85254; Charles Chase, 3915 E. Holmes Ave., Mesa, AZ (US) 85206

( * ) Notice: Subject to any disclaimer, the term of this patent is extended or adjusted under 35 U.S.C. 154(b) by 245 days.

(21) Appl. No.: 10/668,700

(22) Filed: Sep. 23, 2003

(65) Prior Publication Data

US 2005/0248480 A1    Nov. 10, 2005

Related U.S. Application Data

(63) Continuation-in-part of application No. 10/430,167, filed on May 6, 2003, now Pat. No. 6,816,106.

(51) Int. Cl.
*G01S 13/78* (2006.01)
(52) U.S. Cl. .............. 342/45; 342/50; 342/56; 342/57; 342/58
(58) Field of Classification Search ............ 342/43–46, 342/57, 58, 357.01, 357.06–357.09, 357.1, 342/357.12, 386, 450
See application file for complete search history.

(56) References Cited

U.S. PATENT DOCUMENTS

| | | | | |
|---|---|---|---|---|
| 3,573,823 A | * | 4/1971 | French | 342/43 |
| 3,846,797 A | * | 11/1974 | Brown et al. | 342/45 |
| 5,216,429 A | * | 6/1993 | Nakagawa et al. | 342/45 |
| 5,486,830 A | * | 1/1996 | Axline et al. | 342/43 |
| 5,568,152 A | * | 10/1996 | Janky et al. | 342/357.08 |
| 5,636,245 A | * | 6/1997 | Ernst et al. | 375/259 |
| 5,652,588 A | * | 7/1997 | Miron | 342/58 |
| 6,181,272 B1 | * | 1/2001 | Kirk | 342/45 |
| 6,427,121 B2 | * | 7/2002 | Brodie | 701/213 |
| 2001/0006372 A1 | * | 7/2001 | Lemelson et al. | 342/45 |

* cited by examiner

*Primary Examiner*—Thomas H. Tarcza
*Assistant Examiner*—Isam Alsomiri
(74) *Attorney, Agent, or Firm*—Don Carnegie

(57) ABSTRACT

A surveillance system is provided for surveillance of objects within a secure area. A surveillance sensor transmits surveillance signals to all objects within the secure area, the reflections of which are received back by the surveillance sensor to determine the locations of objects, and communicates the determined locations to a pressing facility. Objects authorized to be in the secure area are equipped with an Identification Friend or Foe (IFF) unit that includes a GPS receiver and a data communication transmitter. In response to predetermined conditions, the IFF units broadcast their position and identification to the processing facility for correlation with locations defined by the reflection signals. The reflection signals from other objects are compared with a list of the locations of objects, such as terrain features and man-made facilities, that are known to be in the secure area. If no broadcast information is received from an object and the location of that object determined by the reflection signal cannot be correlated with the known object list; than the object has no proper authorization to be within the secure area, and an alarm is generated.

6 Claims, 6 Drawing Sheets

IDENTIFICATION AND LOCATION SYSTEM FOR PERSONNEL AND VEHICLES

CROSS-REFERENCE TO RELATED APPLICATIONS

This application is a Continuation-In-Part (CIP) of application Ser. No. 10/430,167, now pending, filed May 6, 2003 now U.S. Pat. No. 6,816,106, the entire disclosure of which is incorporated herein by reference.

BACKGROUND OF THE INVENTION (1) Field of the Invention

The present invention relates generally to surveillance systems, and in particular to a surveillance system used in conjunction with a device to provide location and identification of friendly personnel or vehicle targets.

(2) Description of Related Art

Surveillance systems for the detection of personnel and vehicles within sensitive or secured areas are being deployed in significant numbers due to increased concern for security and also due to the availability of effective, affordable sensors. These sensors may use detection methods, and may operate over distances and in environmental conditions that make it impossible for the surveillance system to achieve a detailed identification of each detected target. A "friendly" target is defined as an entity that is authorized to conduct activities within the area. "Unfriendly" targets are not authorized to be in the area and thus are assumed to be hostile. A way must be provided for target Identification—Friend or Foe (IFF) to differentiate between these two classes of targets.

One prior art method of determining the identity of friendly airborne targets is to couple to the surveillance radar antenna a separate antenna that transmits an interrogation signal into the same volume being searched by the radar. A cooperating, friendly aircraft carries on board a transponder that receives the interrogation signal and, after a small delay, responds with a coded reply. The reply may contain specific aircraft identification and altitude or other information. The time delay between sending the interrogation signal and receipt of the reply is used to determine the range to the friendly target. The target identification is then correlated with the skin return detected by the radar, if such detection has occurred. The interrogation signal and transponder reply are typically generated at frequencies that are much different from the radar operating frequency. An aircraft detected by the surveillance radar that does not respond to the interrogation with a proper reply can be labeled a "foe" target. Other prior art IFF techniques have used the surveillance radar signal as the interrogation signal with an appropriate transponder reply on a different frequency. In each of these cases the interrogation and reply signals are typically produced in the microwave region of the radio frequency spectrum, and the transponder must be capable of generating a reply of sufficient microwave power to be received at the radar site. These prior art methods are not practical for use in a surveillance system designed to detect personnel and vehicles within sensitive areas having typical dimensions of no more than a few kilometers.

A prior art example of a data communication network used to provide location information of a multiplicity of friendly entities as well as an IFF function is provided by U.S. Pat. No. 6,181,272 to Kirk. This patent describes a method using a central control station that transmits position requests to one or more field agents. Each of the field agents determine their position by use of a global positioning system (GPS) receiver and reply to the position request with a message that may include location, identification and a code. The central control station includes a receiver to collect the incoming data, a computer and a display to provide a graphical indication of the locations of all participating agents. When it is desired to confirm the "friendly" status of any replying agent, a laser designator is directed to the location of the agent. Each agent carries a laser detector that causes an encrypted response to be sent back to the central control station. This data communication network can determine the GPS coordinates of all participating agents, but the location accuracy of the replying agent is limited to the accuracy of a GPS receiver operating autonomously.

These prior art examples have several limitations if an attempt is made to apply them for both detection of unauthorized intruders and identification of authorized entities within a secured area having dimensions of no more than a few kilometers. The radar and IFF system for airborne applications usually requires a separate interrogation transmitter and microwave receiver at the radar site to stimulate and receive responses from IFF equipped aircraft. The IFF units are not easily reconfigured as man carried, low power consumption devices that typically operate at a range in the order of a kilometer from the surveillance radar. The method taught by the Kirk patent requires a laser interrogator for positive identification of participating agents. It is capable of determining the location of participating agents only, and has no capability to detect hostile intruders. Further, it does not present a display of the relative position of the responding agents with respect to various physical structures, etc. within the area unless a map overlay is added to the display. For these and other reasons, a method or a means of target Identification—Friend or Foe (IFF) is needed that is compatible with surveillance sensors and systems used for security purposes.

SUMMARY OF THE INVENTION

The present invention provides a new and improved method for detecting the presence of vehicles and personnel within a secured area, and for determining if a detected target is a "friend" or "foe". It is an advantage of the present invention that the IFF unit carried by each authorized entity is light in weight and consumes a relatively small amount of power, thus minimizing the weight of the included batteries. It is also an advantage of the present invention that each IFF unit is capable of uniquely identifying the authorized person to which it is assigned, as well as its GPS derived position, velocity and direction of movement. It is still another advantage of the present invention that the only additional equipment that is required at the site of the surveillance radar is a GPS receiver and a data communication unit. This data communication unit receives identification and position data from the IFF units, and transmits IFF unit data and surveillance radar detection data to a processing facility. The processing facility has means to display a depiction of both the physical features of the secured area and the location and identification of each authorized entity. Any additional targets detected and displayed can be assumed to be hostile entities.

An additional advantage of the present invention is that computation of the range and bearing from the GPS receiver located at the radar to each of the IFF units allows determination of the IFF unit position from the radar to an accuracy of substantially one square meter.

The IFF unit includes a GPS receiver, a radar receiver, a memory module containing identification data unique to that unit, and a communication link transmitter. As the radar scans the secured area, the main beam briefly impinges upon each IFF unit. The radar receiver determines when the main beam event occurs and commands the communication link transmitter to transmit message containing the unit's identification and GPS derived coordinates. The present invention makes maximum use of commercially available, off the shelf subsystems, including the GPS receivers, the communication link transmitters within the IFF units, the surveillance radar, the data communication unit, and a personal computer for data processing and the radar display. This use of commercially available subsystems keeps the overall cost of the present invention to a minimum, as well as minimum size and powerconsumption of subsystems included in the IFF units.

These and other features, aspects, and advantages of the invention will be apparent to those skilled in the art from the following detailed description of preferred non-limiting embodiments, taken together with the drawings and the claims that follow.

BRIEF DESCRIPTION OF THE DRAWINGS

It is to be understood that the drawings are to be used for the purposes of illustration only and not as a definition of the limits of the invention.

Referring to the drawings in which like reference numbers present corresponding parts throughout.

DETAILED DESCRIPTION OF PREFERRED EMBODIMENT

Figure 1:
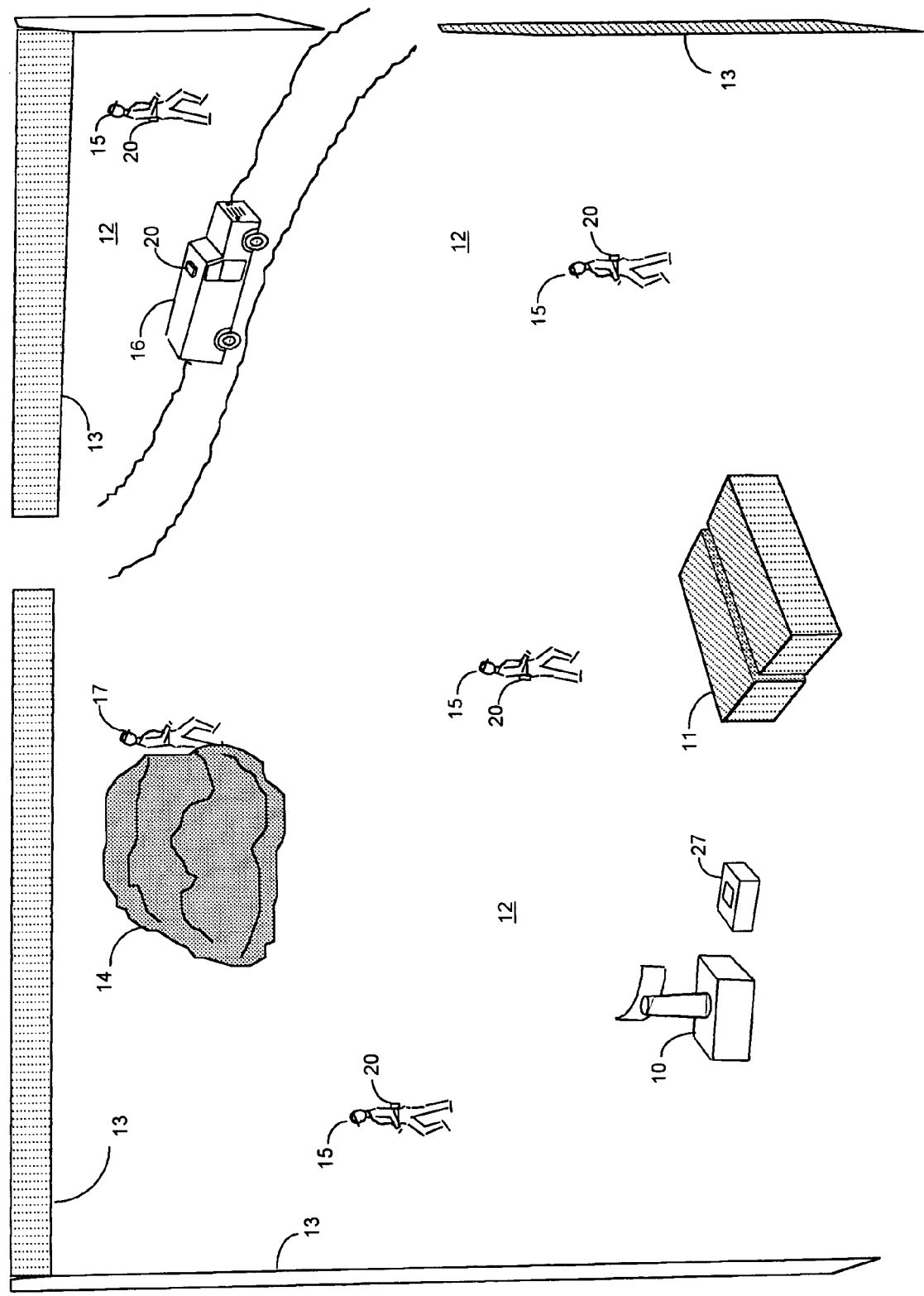
FIG. 1 illustrates the use of a surveillance sensor to detect the presence of friendly and hostile entities within a protected area, according to an embodiment of the present invention.

An example of a surveillance system of the present invention deployed to protect a sensitive area is shown in FIG. 1. The surveillance sensor 10 is implemented as a millimeter wave surveillance radar. Containers 11 are depicted as examples of high value assets in need of protection. These containers 11 are located within a secured area 12, defined by the fence 13. Although a fence is shown, the surveillance sensor 10 makes it possible to protect the secured area 12 without the requirement for a surrounding fence. The surveillance sensor 10 has a detection range sufficient to surveil the entire secured area 12, and is typically equipped with a rotationally scanning antenna that provides coverage of the entire secured area 12 including the area surrounding the containers 11. The secured area 12 may include terrain features, such as the rock formation 14, or man made structures (not shown) that generate fixed position returns for the surveillance sensor 10.

Multiple "friendly", authorized personnel 15 and authorized vehicles 16 may have legitimate needs to perform duties within, or traverse the secured area. It is possible that unauthorized or hostile personnel or vehicles will enter the secured area 12; with an example being the hostile intruder 17. The purpose of the surveillance system is to detect these intrusions and allow interdiction of any unauthorized or hostile intruder before any undesired consequences occur. Typically, the surveillance sensor 10 is coupled to a communication link (not shown), which relays the radar detection data to a processing facility 37 where the data is processed and displayed for viewing by security personnel. The radar display usually depicts natural terrain features and manmade structures as well as any moving targets within the secured area. The processing facility 37 may be located within secured area 12 or may be located elsewhere.

The surveillance sensor 10 operating alone can detect the presence of static and moving objects (e.g. vehicles or personnel) within the secured area 12. However, it is incapable of determining if a detected target is a "friend" or "foe". What are needed are a method and the required additional support equipment (hardware and software) to allow identification of detected targets. The additional hardware should not add significantly to the overall cost of the surveillance system, nor require "friendly" personnel to be excessively burdened by heavy or cumbersome equipment. The additional equipment should allow specific identification of each authorized person or vehicle within the secured area. The surveillance system should be capable of presenting a display of both the physical features of the secured area and the location and identification of each authorized entity. Any additional targets detected should be displayed and can be assumed to be hostile entities.

A preferred embodiment of the present invention includes the surveillance sensor 10 of FIG. 1, the addition of an IFF unit 20 carried by each authorized person 15 or vehicle 16 within the secured area 12, the addition of a GPS receiver 27 at the surveillance sensor 10 location, and the method used to exploit the information provided by each of these subsystems. The surveillance sensor 10 comprises a frequency modulated continuous wave (FM-CW) radar operating in the millimeter wave region of the electromagnetic spectrum. The radar includes a continuously rotating antenna that forms a beam characterized by a narrow beamwidth in azimuth and a beamwidth in elevation sufficient to provide beam impingement upon all objects within the secured area 12 that are in line of sight to the radar. The rate of beam rotation is sufficiently high to enable multiple detections of targets moving through the secured area for all anticipated target velocities. While the present invention is described using an FM-CW radar, any sensor system capable of providing the desired target location accuracy may be used.

Figure 2:
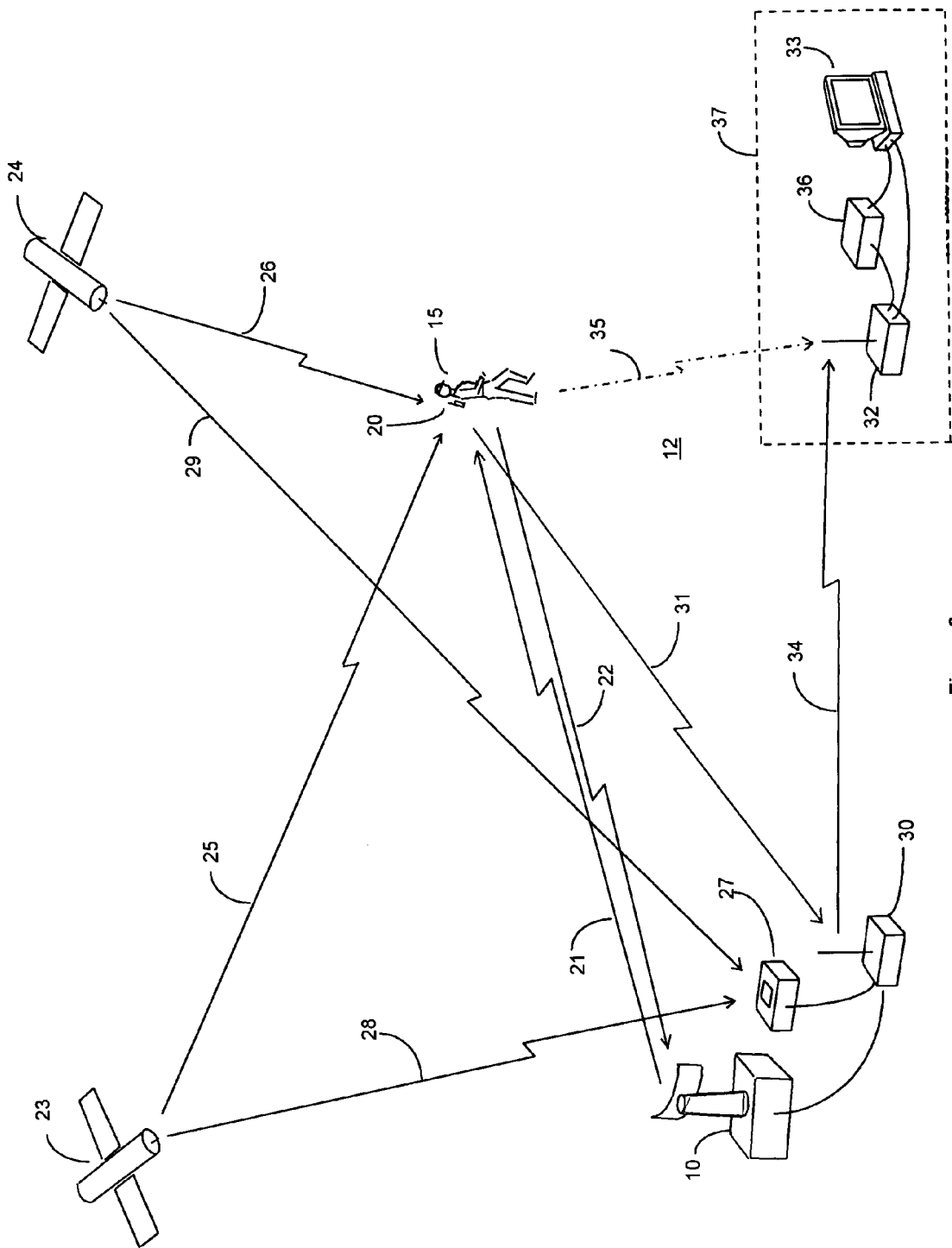
FIG. 2 is a depiction of the various electromagnetic ray paths that are employed by an embodiment of the present invention.

FIG. 2 is a depiction of the various electromagnetic ray paths that are employed by the present invention. Several of these rays are received by and others emanate from the IFF unit 20 carried by an authorized person 15 present in the secured area 12. Multiple authorized personnel may be present in the secured area with each equipped with an IFF unit 20. Similar ray paths to those shown traverse between the various transmission and reception nodes and each of the IFF units 20 existent within secured area 12. Ray 21 is included in the surveillance sensor 10 transmitted beam at the time that the beam is directed toward the authorized person 15. Ray 22 depicts that portion of the energy in the transmitted beam that is reflected from the authorized person and returned to the radar antenna whereupon it is detected, processed and displayed by the radar display 33. As the radar beam rotates, other targets within the secured area also reflect transmitted energy back to the radar antenna in the same manner as that for rays 21 and 22. If the IFF unit of the present invention is not used, only rays 21 and 22 associated with each of the multiple targets of various types existent within the secured area will be present.

Figure 3:
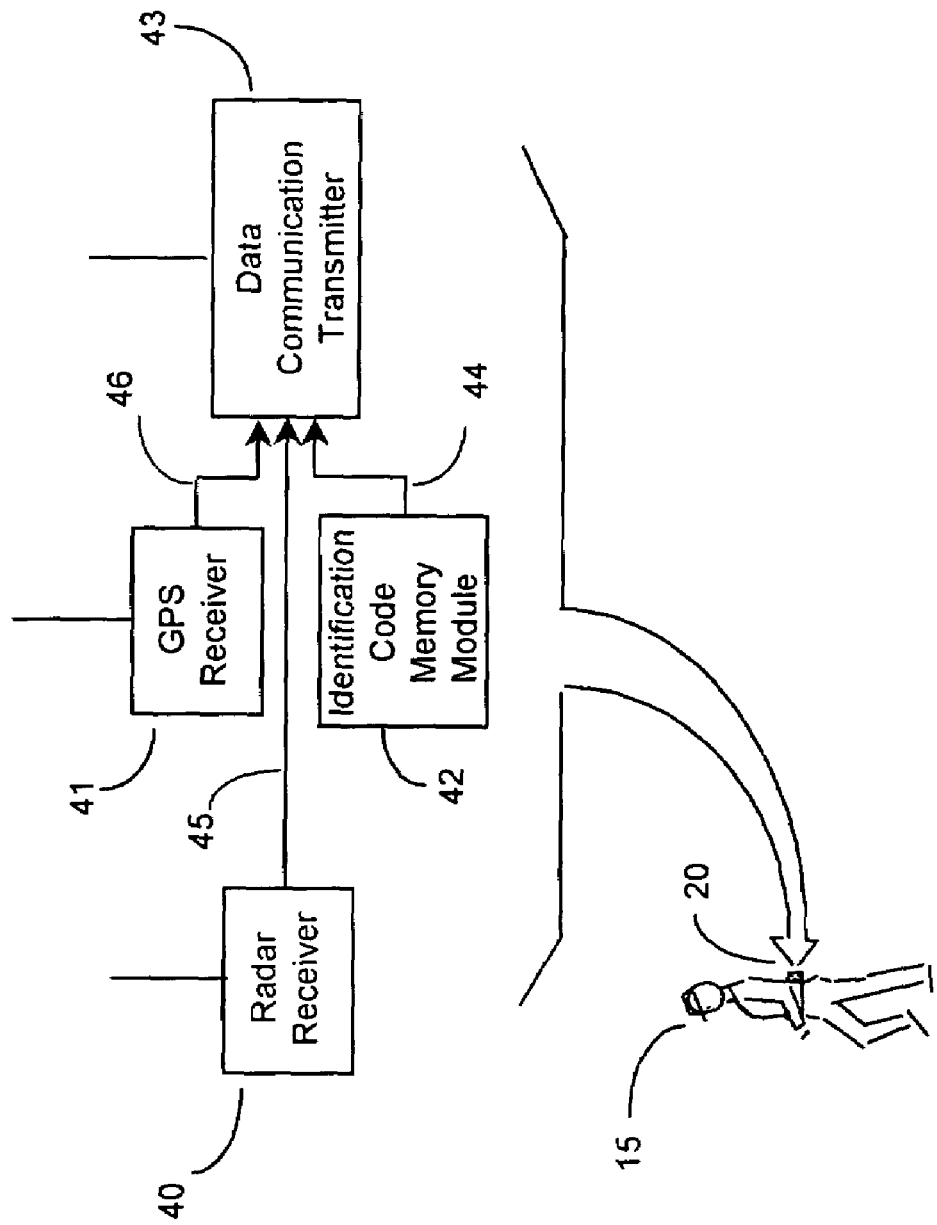
FIG. 3 depicts the subsystems that are included within the IFF unit 20, in accordance to an embodiment of the present invention.

The IFF unit 20 includes a global positioning system (GPS) receiver 41 illustrated in FIG. 3, and batteries to supply power to the GPS receiver and all other circuits within the unit. Referring to FIG. 2, GPS satellites 23 and 24 are depicted as two of the constellation of GPS satellites that circle the earth. A sufficient number of satellites are in orbit to provide multiple satellite, direct line-of-sight links to any geographical location on the surface of the earth. Rays 25 and 26 depict GPS signals received from GPS satellites 23 and 24 by the GPS receiver in IFF unit 20. Signals are also simultaneously received from other GPS satellites that are not shown. Included within the GPS receiver of the IFF unit 20 is a data processor that is capable of using the information contained in the multiple GPS satellite signals to compute the current time and the GPS derived location of the IFF unit in terms of Universal Transverse Mercator (UTM), latitude and longitude, or other suitable coordinates. It also computes altitude, and the velocity and direction of a moving GPS receiver. This positional data is continuously updated as the satellites move in orbit and the IFF unit 20 is changed in position.

In a preferred embodiment of the present invention, a GPS receiver 27 illustrated in FIG. 2 is collocated with the surveillance sensor 10. GPS receiver 27 receives the signals emanating from satellites 23 and 24 as depicted by rays 28 and 29, as well as additional signals from other GPS satellites that are not shown. GPS receiver 27 determines the current time and its GPS derived location by the same method and in the same coordinate system as that used by the GPS receivers in the IFF units. Both surveillance sensor 10 and GPS receiver 27 are coupled to the data communication unit 30.

The IFF unit 20 includes a radar receiver 40 (shown in FIG. 3) capable of receiving a portion of the surveillance radar's transmitted beam, as depicted by ray 21 of FIG. 2, and thus determining when the radar's beam is directed toward the IFF unit. Also included within IFF unit 20 is a data communication transmitter 43. Each time the radar beam (Ray 21) is detected, the data communication transmitter 43 broadcasts a message that contains an identification code unique to the particular IFF unit, any other authentication data that may be required, and its GPS determined position, velocity and direction data and the time that the data was determined. Ray 31 defines the path of this transmission to the data communication unit 30 located near the surveillance sensor 10. The data communication transmitter included in the IFF unit operates within a frequency band having desirable characteristics for data communication purposes within the environment of the secured area 12, and at an output power level sufficient to accomplish data transmission with a very low error rate. For the short distances, only a few milliwatts of power are required, thus minimizing the energy consumption from the batteries in the IFF unit.

The data communication unit 30 illustrated in FIG. 2 includes a receiver capable of receiving the identification and position data from each of the IFF units 20 within the secured area 12. The data communication unit 30 combines into a composite data stream the surveillance sensor 10 target detection data, the radar position data from GPS receiver 27, and the identification and position data from the IFF units 20. This data stream is sent to the data communication unit 32 that is collocated with the radar display 33 in the processing facility 37. Ray 34 represents this communication path. The communication path may be electromagnetic, optical or hard wired.

The data communication unit 32 and radar display 33 are often placed at a processing facility 37 whose location is remote from the secure area 12. The remote location is frequently an enclosure housing security personnel that monitor the activities in one or more secured areas. If the distance between the secured area 12 and the data communication unit 32 is sufficiently small, each of the IFF units 20 can transmit their identification and position data directly to the data communication unit 32. Ray 35 depicts this alternate arrangement of ray paths.

The ability of a GPS receiver (27 and 41) to accurately determine its position on the surface of the earth is limited by several factors. These include the position of the satellites, the number of satellites from which signals are being received, their elevation angle with respect to the horizon and the bearing to each. Other factors include the propagation effects of the ionosphere and troposphere, accuracy of ephemeris data, satellite clock drift, and multi-path effects. The result of the combination of these factors is that a GPS receiver will compute a position that is in error with respect to its true position. The position error can be defined by its magnitude and bearing from the true position of the GPS receiver. A magnitude of 10 to 20 meters is typical while the bearing may represent any direction. The position error will change as the factors producing the error change.

Multiple GPS receivers separated by no more than a few kilometers and having the same performance capability, will receive GPS signals from the same set of in-view GPS satellites. These GPS receivers are subjected to the same error producing factors when they derive their locations essentially simultaneously. Consequently, although each will compute a position that contains a position error, the position error for every GPS receiver will be substantially the same. Well known to those of skill in the art are algorithms that accept the position data of two locations on the earth's surface, defined, for example, in terms of their latitudes and longitudes, and compute the bearing and range of one with respect to the other with an accuracy limited only by the precision of the position data. Using these algorithms and the position data from two GPS receivers, the position of one with respect to another can be determined with an accuracy of substantially one meter in range and one meter along the arc normal to the range vector.

The present invention must be capable of associating the GPS derived location data received from each IFF unit with the location of the correct surveillance sensor 10 detected target. Then, any remaining radar detected targets that exhibit movement can be declared to be unauthorized or hostile targets. The surveillance sensor 10 preferably has a target location range accuracy of one meter, and an azimuthal accuracy of a few meters depending upon range and antenna beam width. A secured area 12 may contain many fixed position objects that constitute radar reflectors and thus targets, as well as a number of individuals 15 and vehicles 16 authorized to be in the area and thus equipped with IFF units 20. The resulting radar display of the secured area will contain many targets. If the GPS position reports from the IFF units were used alone with their inherent position errors having magnitudes of 10 to 20 meters, it would be difficult to associate each IFF unit report with its correct displayed radar return.

Individuals authorized to perform activities within the secured area 12 and thus equipped with IFF units 20 may often work in pairs or larger groups with spacing between individuals of from less than a meter to a few meters. The radar return from a closely spaced pair or group may be indistinguishable from that of a single individual. The reports from each IFF unit and their association with the correct radar return or returns will allow identification of each individual within the group.

Even though numerous targets are encountered in the secured area 12, the association of any particular radar target detection with the correct IFF unit 20 report is made possible by collocating the GPS receiver 27 with the surveillance sensor 10, and by the computations carried out by the IFF correlator 36 located in the processing facility 37. The GPS derived positions, determined at substantially the same time, of GPS receiver 27 and each IFF unit 20 are supplied to the IFF correlator 36 wherein the aforementioned algorithms are used to compute the bearing and range from the surveillance radar to each IFF unit. This bearing and range data are then compared with radar derived bearing and range data to identify the correct radar return from each target equipped with an IFF unit. While the terms bearing and range data are used, any other offset location identifying system can be used.

In the present invention, the identification and position data from each IFF unit 20, the surveillance sensor 10 target detection data, and the radar position data from GPS receiver 27 are combined into a composite data stream that is transmitted from the data communication unit 30 to data communication unit 32. The composite data stream is then passed to the IFF correlator 36 and the radar display 33. The radar display is typically realized as a personal computer (PC) that may include the computational capability to resolve the composite data stream into its component parts, compute the range and bearing from the GPS receiver 27 to each reporting IFF unit 20 (perform the IFF correlation function), convert the radar data stream and IFF unit position data into appropriate graphics, and display the result on the PC monitor, or other suitable display device.

FIG. 3 provides details of the IFF unit 20 that includes a radar receiver 40, a GPS receiver 41, an identification code memory module 42, and a communication link transmitter 43. Separate antennas, each optimized for its frequency of operation, are mounted on the surface of the IFF unit and coupled to the receivers and to the communication link transmitter. The GPS receiver 41 is a commercially available unit that continuously supplies positional data in a format having a precision better than one meter. The positional data is typically provided in UTM form, but can be in another format if preferred for data transmission and relative position computations. Velocity and directional data are also supplied and used if the IFF unit is moving. The communication link transmitter 43 is also a commercially available module. Features considered in selecting the GPS receiver 41 and the communication link transmitter 43 are small size, low power consumption, and compatibility with packaging with other modules in a convenient configuration for the IFF unit 20.

Identification code memory module 42 includes a nonvolatile, re-programmable digital memory device having sufficient memory to store all the identification parameters that may be needed to uniquely identify the IFF unit of which it is a part, and to authenticate its use by the authorized person 15 to which it is assigned. Typically, the identification parameters may include a unique identification code for the IFF unit, a "code-of-the-day" that is inserted daily or on a periodic basis, and a personal code inserted by the authorized person when beginning to use a particular IFF unit. The module 42 may also include a "dead-man switch" that will substitute an alarm code for the personal code if the IFF unit is removed from the authorized person without a proper shut down procedure being performed. These identification code segments are concatenated into an identification message 44 that is supplied to the communication link transmitter 43.

The radar receiver 40 is capable of monitoring the portion of the millimeter wave spectrum in which the surveillance sensor 10 operates. When the radar main beam (Ray 21) is directed toward IFF unit 20, the increase in the radar signal amplitude is sensed and the radar receiver 40 generates a control signal 45 that is coupled to the communication link transmitter 43. Control signal 45 initiates the process whereby the identification message 44 from the identification code memory module 42 and the position, velocity and direction data 46 from the GPS receiver 41, including the time of position determination, are concatenated into a message that is transmitted by the communication link transmitter 43. This transmission of identification and positional data is repeated each time the main beam of the surveillance radar antenna completes a revolution and again aims the main beam toward the IFF unit. Alternatively as a power saving method the transmission may need only occur every N times a Ray 21 is detected, where N may be a fixed number or may be a variable. For example, if a vehicle is not moving, i.e., parked then it may only respond every 10 seconds.

Figure 4:
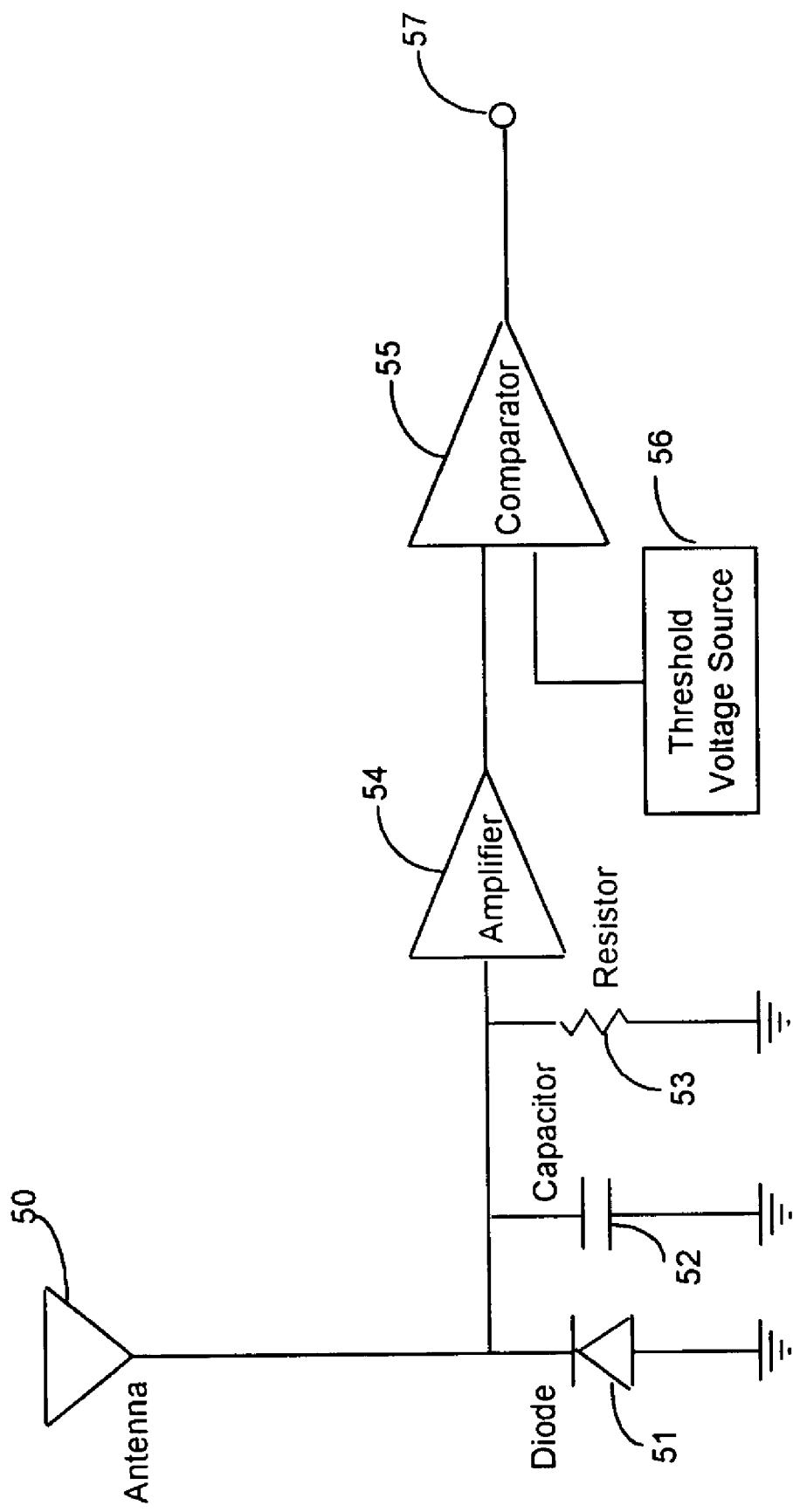
FIG. 4 illustrates a block diagram of the radar receiver 40, in accordance to the present invention.

FIG. 4 presents a block diagram of the radar receiver 40 that is included within the IFF unit 20. The antenna 50 is designed for efficient collection of energy in that portion of the millimeter wave spectrum in which the surveillance radar operates. The antenna 50 is coupled to a diode 51 in parallel with a capacitor 52 and a resistor 53. The diode 51 functions as a signal detector by acting as a half-wave rectifier that conducts to ground the negative half-wave excursions of the signal from the antenna and causes the positive half-wave excursions to accumulate a charge on the capacitor 52. When the main beam of the surveillance radar is directed at the antenna 50, the signal strength of the radar is typically sufficient to produce a charge of several millivolts on capacitor 52. Since the purpose of the radar receiver is to determine when the surveillance radar's main beam being directed at the IFF unit, the resistor 53 is included to bleed the charge off capacitor 52 after passage of the radar main beam.

Amplifier 54 is coupled to the capacitor 52 and has sufficient gain to produce an output of several volts when the charge on the capacitor reaches a maximum during the presence of the radar main beam. Comparator 55 is provided with two inputs, one from the voltage source 56 and the other from the output of amplifier 54. The voltage source 56 provides a constant threshold voltage that is significantly greater than the output voltage of amplifier 54 when only internal noise plus random signals are being received by antenna 50 and the main beam of the surveillance radar is not directed toward the IFF unit. The output of comparator 55 remains at substantially zero volts while the output of amplifier 54 is less than the threshold voltage from voltage source 56. The comparator output switches to its maximum value when the output of amplifier 54 exceeds the value of the threshold voltage in response to the reception of the main beam of the surveillance radar. The comparator output 57 comprises the control signal 45 that commands the communication link transmitter 43 to transmit a message containing the IFF unit's identification and position data. The radar receiver 40 may be realized by the inclusion of components having a range of characteristics and parameter values. The process of component selection and component value determination to produce a functioning radar receiver is well known to those of skill in the art.

Figure 5:
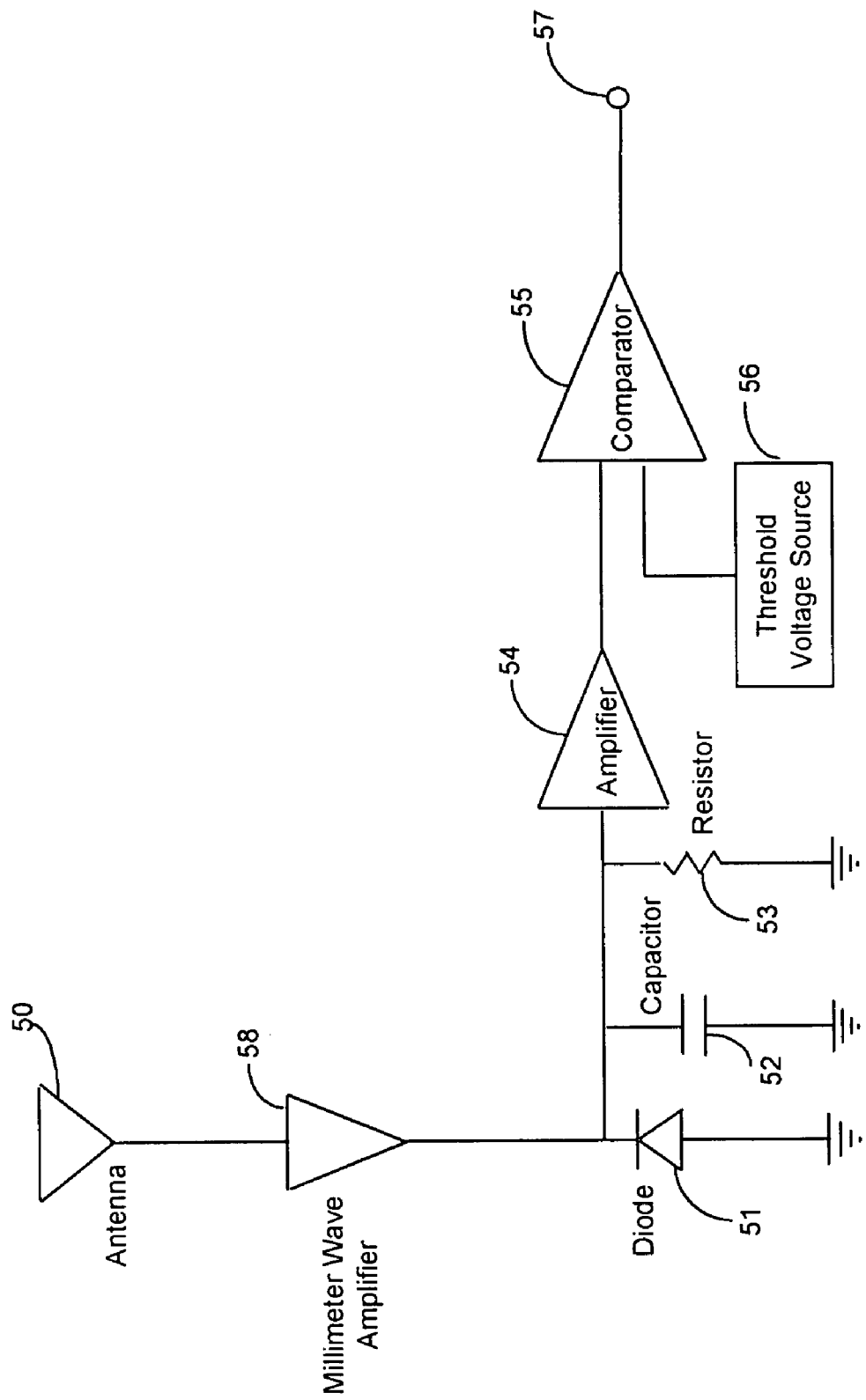
FIG. 5 illustrates a variation of the block diagram for the radar receiver illustrated in FIG. 4, in accordance to the present invention.

FIG. 5 shows an alternate configuration for the radar receiver 40. In this configuration, a millimeter wave amplifier 58 is added to the block diagram of FIG. 4 between the antenna 50 and the remainder of the circuit. In some installations of the present invention, the secured area 12 may be sufficiently large that the range from the surveillance radar 10 to some IFF units 20 may be so great that direct detection of the antenna 50 output is not possible. In that event, the addition of the millimeter wave amplifier 58 will increase the signal level to the diode detector and will greatly increase the reliability of determining the passage of the radar main beam.

Figure 6:
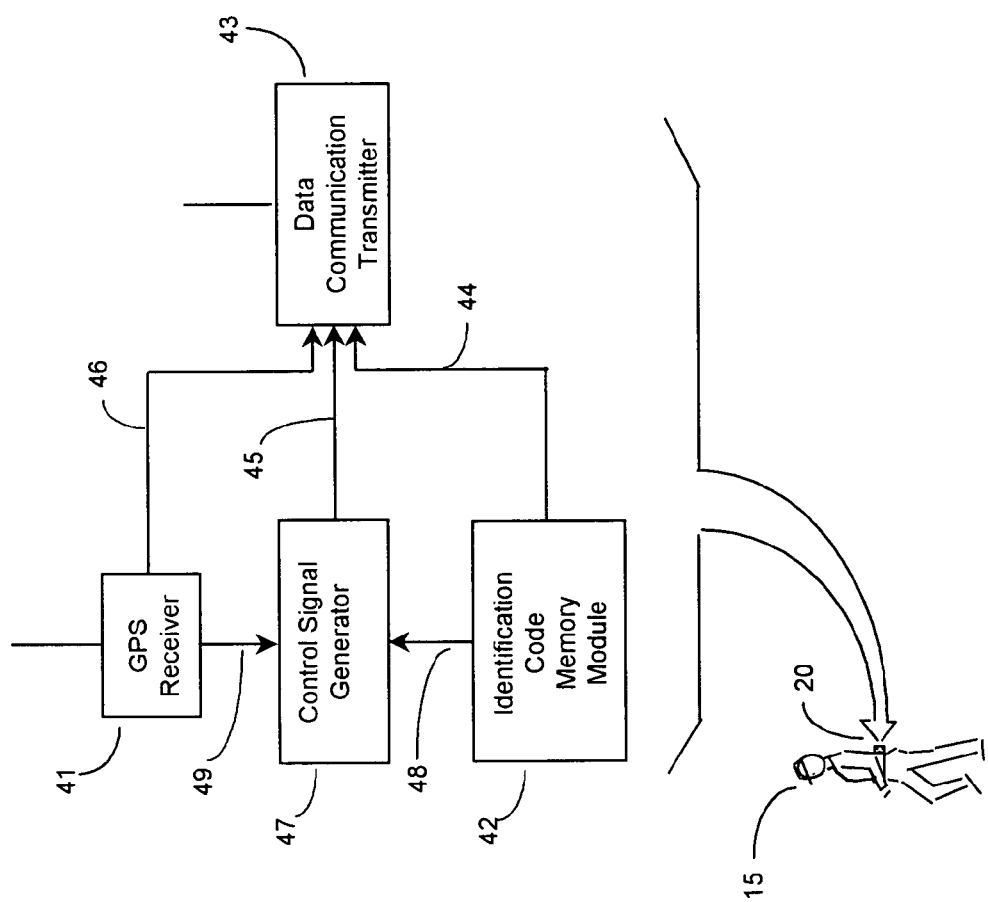
FIG. 6 depicts the subsystems that are included within the IFF unit 20, in accordance to an alternate embodiment of the present invention.

An alternate embodiment of the present invention includes several changes to the IFF unit 20 that are depicted in FIG. 6. The radar receiver 40 is eliminated and a control signal generator 47 is used in its place. This alternate configuration of the IFF unit 20 is preferred when the secured area 12 extends over a distance of several kilometers and thus the range between the surveillance radar and an IFF unit may be sufficiently great that detection of the radar main beam is difficult. Another advantage of this alternate embodiment is that a millimeter wave antenna 50 and millimeter wave amplifier 58, as well as other radar receiver 40 components, are not required, thus reducing unit cost.

As shown in FIG. 6, this alternate configuration of IFF unit 20 includes the same GPS receiver 41, identification code memory module 42, and data communication transmitter 43 previously depicted in FIG. 3. Antennas, each optimized for its frequency of operation, are mounted on the IFF unit surface and are coupled to the GPS receiver 41 and data communication transmitter 43.

The identification code memory module 42 includes a non-volatile, reprogrammable digital memory device that has sufficient memory to store all identification parameters to uniquely identify its IFF unit. These identification parameters may include a unique identification code for the particular IFF unit, a "code-of-the-day" that is inserted daily or on a periodic basis, and a personal code inserted by the authorized user. The identification code memory module 42 also includes a quantity defining a transmission time delay 48 that is unique for each IFF unit. Other characteristics of the memory module 42 previously described are also included in this alternate configuration; including a "deadman switch" function, and the capability to concatenate the identification code segments into an identification message 44 that is supplied to the communication link transmitter 43.

The GPS receiver 41 has the capability to receive signals from the constellation of GPS satellites, process the data contained in the multiple GPS signals and compute several parameters including the current time, the location in UTM or other suitable coordinates, and velocity and direction if the IFF unit is moving. The current time 49 is continuously supplied by the GPS receiver 41 to the control signal generator 47. The GPS receiver also continuously supplies time, position, velocity and direction data 46 to the data communication transmitter 43.

The time data provided by the GPS system has an accuracy of better than 0.2 microseconds. All GPS receivers in all IFF units, as well as GPS receiver 27 collocated with the surveillance sensor 10, all report the same time within these limits of accuracy. In the alternate configuration of IFF unit 20, the control signal generator 47 accepts the current time 49 from the GPS receiver 41 and extracts a timing reference coincident with the beginning of each second. All IFF units perform this same function and thus all possess timing references that occur simultaneously. The control signal generator 47 uses the timing reference to begin a timing counter. When the counter time equals the transmission time delay 48, provided by the identification code memory module 42, a control signal 45 is generated and sent to the data communication transmitter 43.

The control signal 45 initiates the process whereby the identification message 44 from the identification code memory module 42 and the time, position, velocity and direction data 46 from the GPS receiver 41 are concatenated into a message that is transmitted by the communication link transmitter 43. Typically, the time required to transmit this message is less than five milliseconds. A unique transmission time delay 48 is programmed into each IFF unit 20 with the minimum difference between any two time delays being substantially ten milliseconds. Therefore; using the well known time division multiplex technique, as many as 100 different IFF units can transmit their identification and GPS derived data during each one second interval, while all are transmitting on the same frequency. In the interests of reducing power consumption in the IFF units, those that undergo very little or no movement can be programmed to transmit only every M seconds, where M may be a fixed number or may be a variable related to velocity, etc.

The identification and GPS derived data for each IFF unit 20 operating in the secure area 12 (see FIG. 1 and FIG. 2) is transmitted, indirectly or directly, to the data communication unit 32 that in turn supplies the data to the IFF correlator 36. In the correlator, the locations of every IFF unit 20 relative to the location of the GPS receiver 27 are computed. These locations are then compared to the locations of various targets detected by the surveillance sensor 10. Each detected target that has a location coincident with an IFF unit 20 is displayed on the radar display 33 as a "friendly" target and is tagged with the identification data from that IFF unit. Any detected target that undergoes movement (not a fixed target such as a building or terrain feature) and is not associated with an IFF unit 20 is assumed to be a hostile entity and the radar display alerts security personnel to its location.

While illustrative exemplary embodiments of the invention have been described, numerous variations and alternative embodiments will occur to those skilled in the art. For example, while data communication transmitter 43 shown in FIG. 3 is described as a transmitter, its function can also be provided by a bi-directional communication apparatus either networked or by direct communication. Examples of bi-directional communication apparatus are an APCO 25 handset or a commercial cell telephone. Examples of a direct communication apparatus are a Citizen Band radio or a HaveQuick transceiver. Another example is variations in a direct path of rays 31 and 35 from IFF 20 to the data communication unit 30 or 32, illustrated in FIG. 2. It is not necessary that the communication link be restricted to a direct path. The communication depicted by rays 31 and 35 could be performed by a cellular based communication device (e.g. APCO 25 handset or cell telephone.) What is essential is that information from the IFF units 20 are communicated to the processing facility 37. Additionally, communication devices are now available with an internal GPS capability, so the IFF unit 20 GPS function may be provided by the communication device's GPS unit. When a bi-directional communication network is used, the GPS derived location of IFF 20 can be transmitted upon request over the bi-directional communication network independent of surveillance sensor 10. The processing facility 37 may request a location update from an IFF 20 over the bi-directional communication network. By using an existing bi-directional communication infrastructure and coupling a radar receiver to a bi-directional communication apparatus a low cost system can be built. Such variations and alternate embodiments are contemplated, and can be made without departing from the spirit and scope of the invention as define in the appended claims. Therefore, it is manifestly intended that this invention be limited only by the claims and equivalents thereof.

We claim:

1. A surveillance system, comprising:
   a surveillance unit;
   at least one Identification-Friend or Foe (IFF) unit 20 coupled to at least one object; and
   a processing facility;
   said surveillance unit transmits surveillance signals to all objects within a surveillance area, and upon receipt of reflections of said transmitted signals determines locations of said objects relative to the location of said surveillance unit and communicates said determined locations to said processing facility;
   said at least one IFF unit coupled to at last one object broadcasts repeatedly at predetermined times messages containing identification and location information of said object coupled to said IFF unit to said processing facility;
   said processing facility compares said broadcast messages from said IFF units with said communications from said surveillance unit and performs computations including determination of all locations of all properly authorized objects within said surveillance area, identification of objects not authorized to be in said surveillance area, and generation of appropriate notice.

2. A surveillance system as claimed in claim 1, wherein said IFF unit coupled to said object includes a GPS receiver for determining parameters including time and the location of said object.

3. A surveillance system as claimed in claim 1, wherein said surveillance unit is collocated with a GPS receiver for determining parameters including time and the location of said surveillance unit, and is capable of communicating said time and location of said surveillance unit to said processing facility.

4. A surveillance system as claimed in claim 3, wherein said processing facility compares said GPS determined location of said surveillance unit with said GPS determined locations of said objects coupled to said IFF units to determine the relative positions of said objects with respect to said surveillance unit, and correlates each said relative position of each said object coupled to said IFF unit with the corresponding said reflection of said transmitted signal.

5. A surveillance system as claimed in claim 1, wherein said processing facility performs computations including categorization of all said reflections of said transmitted surveillance signals as: returns from fixed position objects known and approved to be in said surveillance area, objects coupled to said IFF units and approved to be in said surveillance area, and objects not approved to be in said surveillance area; for generating an alert when said objects not approved to be in said surveillance area are detected.

6. A method for identification interrogation, comprising the steps of:
   a) transmitting at least one surveillance signal;
   b) determining location of at least one object based on a reflection of said transmitted surveillance signal from said object;
   c) broadcasting at least one message containing identification and position information from said at least one object; and
   d) correlating said location information from said reflection signal with said broadcast information from said object to determine location of said object properly authorized to be within a surveillance area.

* * * * *